(12) United States Patent
Heide et al.

(10) Patent No.: US 12,065,321 B2
(45) Date of Patent: Aug. 20, 2024

(54) SYSTEM FOR MOVING GOODS INTO, OUT OF, AND WITHIN HIGH-BAY STORAGE

(71) Applicant: AMOVA GMBH, Netphen (DE)

(72) Inventors: Carsten Heide, Netphen (DE); Volker Brueck, Mudersbach (DE)

(73) Assignee: AMOVA GMBH, Netphen (DE)

( * ) Notice: Subject to any disclaimer, the term of this patent is extended or adjusted under 35 U.S.C. 154(b) by 438 days.

(21) Appl. No.: 16/076,089

(22) PCT Filed: Mar. 15, 2017

(86) PCT No.: PCT/EP2017/056140
§ 371 (c)(1),
(2) Date: Aug. 7, 2018

(87) PCT Pub. No.: WO2017/158034
PCT Pub. Date: Sep. 21, 2017

(65) Prior Publication Data
US 2021/0188572 A1 Jun. 24, 2021

(30) Foreign Application Priority Data

Mar. 15, 2016 (DE) .......................... 102016204246.7

(51) Int. Cl.
*B65G 63/00* (2006.01)
*B65G 1/04* (2006.01)
*B65G 35/06* (2006.01)

(52) U.S. Cl.
CPC ......... *B65G 63/004* (2013.01); *B65G 1/0485* (2013.01); *B65G 35/06* (2013.01);
(Continued)

(58) Field of Classification Search
None
See application file for complete search history.

(56) References Cited

U.S. PATENT DOCUMENTS 5,421,688 A 6/1995 Fuechtey et al.
5,615,992 A 4/1997 Proske et al.
(Continued)

FOREIGN PATENT DOCUMENTS

CN 101085658 A 12/2007
JP S50147380 U 12/1975
WO 2007/043085 A1 4/2007

OTHER PUBLICATIONS

Machine translation of JPS50-147380 from espacenet, 1975. (Year: 1975).*

*Primary Examiner* — Mark C Hageman
(74) *Attorney, Agent, or Firm* — Andrew Wilford

(57) ABSTRACT

The invention relates to a transport and handover system for storing and removing or relocating storage goods (1) in high-bay warehouses (2), in particular in a transshipment facility of a seaport or inland port for the storage of standard containers, wherein the high-bay warehouse (2) consists of an arbitrary number of warehouse modules (10), which are arranged next to each other in the longitudinal direction and in the width direction of the high-bay warehouse (2) extending transversely to the longitudinal direction and which have a plurality of rack compartments (12) lying one over the other in the vertical direction, said warehouse modules being separated from each other by aisles (11) extending parallel to the storing and removal sides of the rack compartments (12) or warehouse modules (10), wherein at least one storage and retrieval machine (19) that can move back and forth is provided in each aisle (11) for transporting and storing and removing or relocating the storage goods (1), and a storage and retrieval machine (19). Accelerated transfer with fewer steel constructions is achieved in that the high-bay warehouse (2) is designed with at least one transverse conveying device (13; 113), which crosses at least some aisles (11) and conveys the supplied storage goods (1) into the high-bay (Continued)

warehouse (2) and/or out of the high-bay warehouse. For handling of the storage goods (1) provided from below the level of the running rails (20), the base bar of the storage and retrieval machine (19) is designed with a passage opening in a frame-like manner so that the storage goods (1) can be lifted through.

8 Claims, 4 Drawing Sheets

(52) U.S. Cl.
CPC ............... *B65G 2201/0235* (2013.01); *B65G 2201/0267* (2013.01)

(56) References Cited

U.S. PATENT DOCUMENTS

| | | | |
|---|---|---|---|
| 6,113,336 A * | 9/2000 | Chang | B66F 9/072 |
| | | | 414/281 |
| 10,745,092 B2 * | 8/2020 | Lydle | B63C 15/00 |
| 2008/0107504 A1 | 5/2008 | Jung | |
| 2008/0217278 A1 | 9/2008 | Murata | |
| 2010/0104405 A1 | 4/2010 | Amada | |
| 2016/0060037 A1 * | 3/2016 | Razumov | B65G 1/065 |
| | | | 700/216 |

* cited by examiner

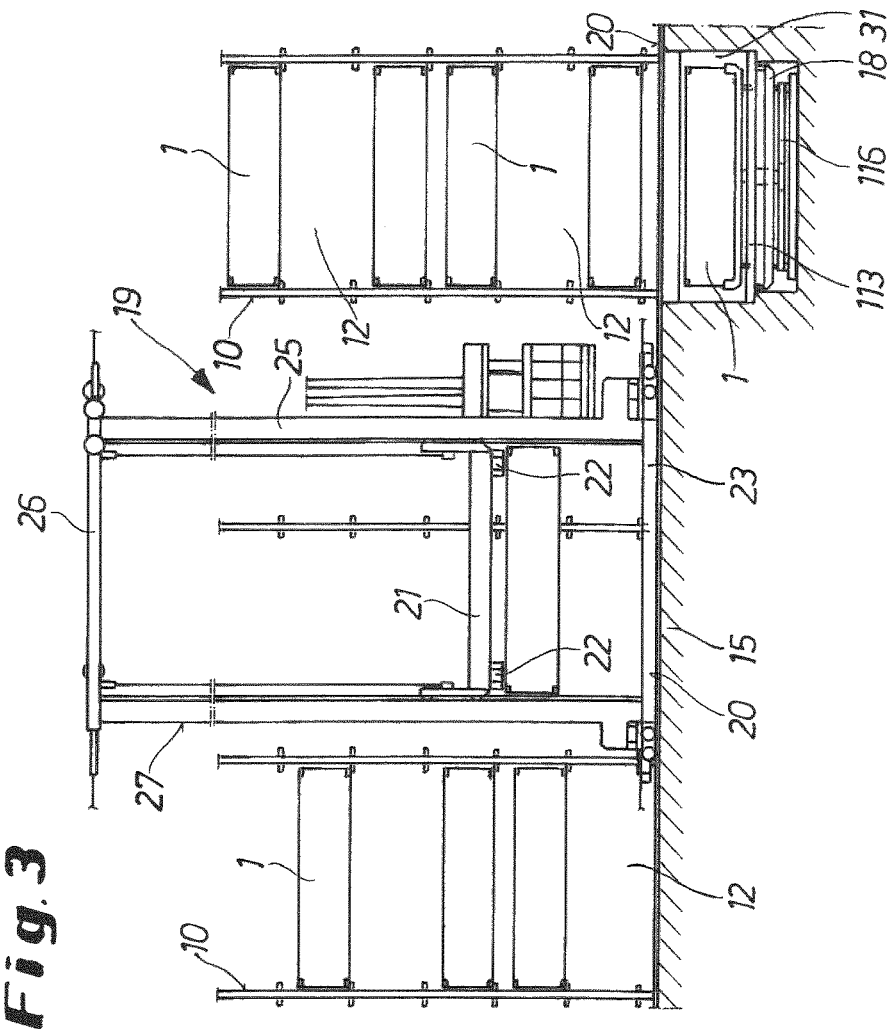
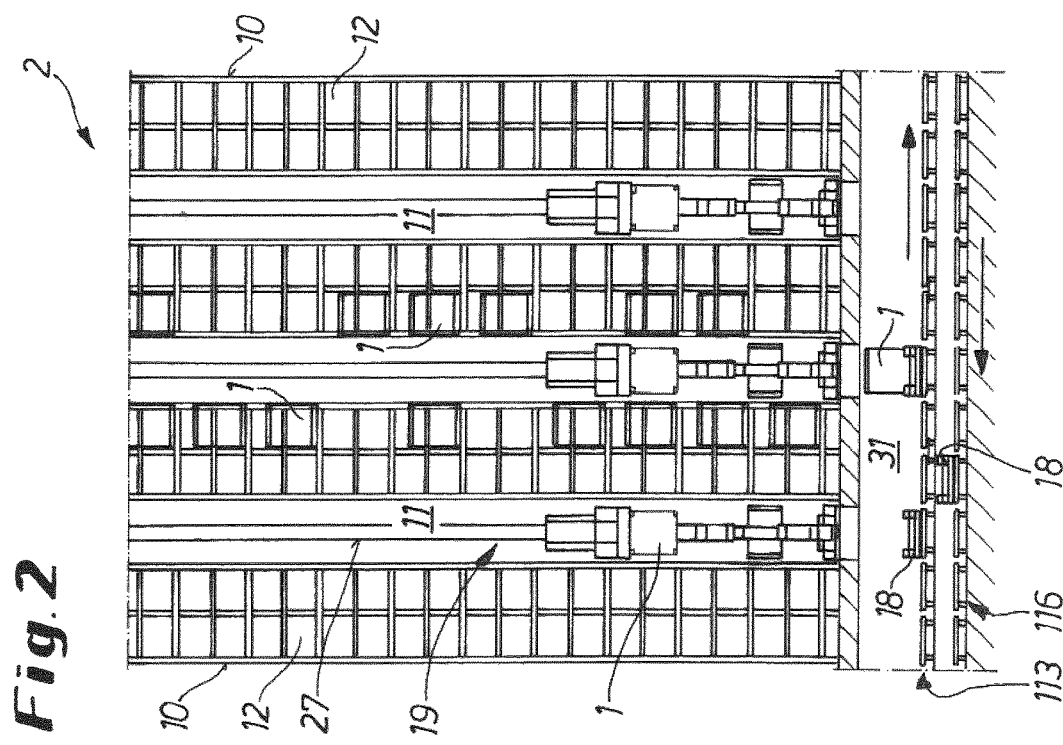

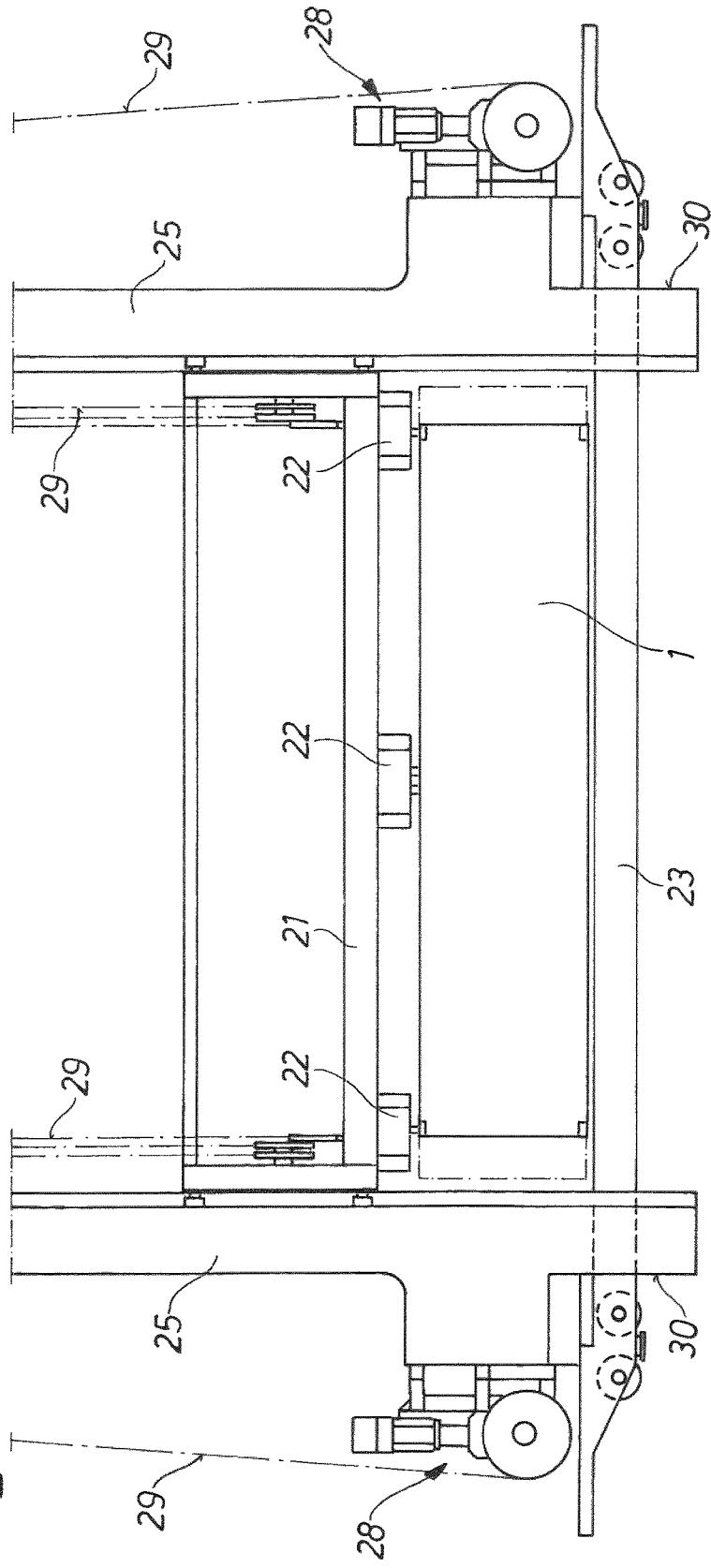
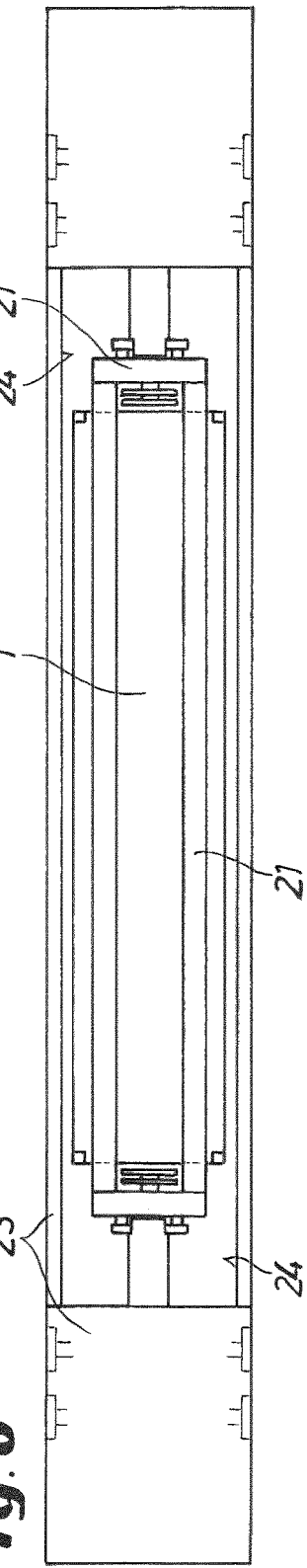

SYSTEM FOR MOVING GOODS INTO, OUT OF, AND WITHIN HIGH-BAY STORAGE

CROSS REFERENCE TO RELATED APPLICATIONS

This application is the US-national stage of PCT application PCT/EP2017/056140 filed 15 Mar. 2017 and claiming the priority of German patent application 102016104246.7 itself filed 15 Mar. 2016.

The invention relates to a transport and transfer system for storing and retrieving or relocating storage items in a high-bay warehouse, particularly in a transshipment facility of a seaport or an inland port for storage of standard containers where the high-bay warehouse has a plurality of storage modules that are in rows in longitudinal direction and in width direction transversely thereto of the high-bay warehouse and in height have a plurality of rack bays disposed one above the other and that are separated from one another by lanes extending parallel to the storing and retrieving sides of the rack bays or of the storage modules, wherein at least one storage and retrieval apparatus that is movable back and forth, for transporting as well as storing and retrieving or relocating the storage items is in each lane.

An integrated, fully automatic container transport system of the kind stated in the introduction with storage and retrieval apparatus arranged in each lane is known from WO 2015/124342 A1 for a transshipment facility of a seaport or an inland port.

The storage and retrieval apparatus that in its dimensions is of narrow construction and that stores and retrieves the containers with the longitudinal sides thereof foremost in the rack bays, is movable in floor-bound manner in longitudinal direction of the lanes. The raising and lowering of the hoist platform that is provided with load receiving means, of the storage and retrieval apparatus is carried out by a cable traction device or a hoist, comprising a cable, cable drums, deflecting rollers, motors and transmissions. Provided at the hoist platform for suspended transport of the containers are load receiving means that are constructed in particularly space-saving manner as telescopic forks or tables for gradual horizontal movement in and out together with a suspended container.

For transfer of the containers transported to the delivery side—this is usually the side of the high-bay warehouse facing the vessel—and to be transported away at the other end of the warehouse it is necessary to provide in front of and behind each lane appropriate preparation stations from which the storage and retrieval apparatus takes over the containers for storage or in which the containers can be deposited for retrieval. That is equally so in the case of in a high-bay warehouse for storage and retrieval of, for example, strips wound to form bundles (coils), particularly rolled metal strips, wherein the coils are taken over from shelves and deposited on shelves or substructures in the rack bays.

In the case of a container terminal known from DE 44 9 740 C1 high transshipment rates, such as have to be guaranteed by, for example, use of several loading or container bridges at a vessel are achieved by a fully automated container transport system that is integrated in a container transshipment facility, in conjunction with loading cranes. For that purpose, track levels that are connected together by a plurality of supports and are offset in height, with loading and unloading positions are on a step-shaped support construction offset in height, wherein each level has a track network with a plurality of transport pallets operated by linear motor and movable thereon. Apart from the fact that a large number of transport pallets specially constructed with linear motor drives as contactless drive means is needed, a substantial outlay on steel construction is unavoidable with the track network, because each level has several interconnected tracks for movement of the transport pallets on a track network to loading and/or unloading and/or junction positions. The different or individual levels interconnected by supports are predetermined by a step-shaped support construction offset in height.

A very large outlay, as described above, additionally with substantial steel structures is also required in a high-bay warehouse with elevated rail tracks when the transfer stations on the uppermost storeys of the high-bay warehouse are integrated into the steel structure and storage cranes that are compartmented by roof attachments and that extend over the lanes to serve all successive multistory storage modules, take over distribution of the supplied containers to the storage and retrieval apparatus.

The invention has the object of creating a transport and transfer system according to category, which enables further accelerated transshipment of storage items such as flat containers, coils and, in particular, standard containers (20 TEU and 40 FEU containers) or otherwise for take-over, by suspension, of suitable storage items, with reduced outlay and fewer steel structures.

According to the invention this object is fulfilled in that the high-bay warehouse is constructed with at least one transverse conveyor that crosses at least some lanes and that conveys the supplied storage items into and/or out of the high-bay warehouse.

Starting from the assumption that the lanes run parallel to the long sides, i.e. the longitudinal sides of the high-bay warehouse, the transverse conveyor extends or several transverse conveyors—that can be provided in distribution at a spacing from one another at the longitudinal sides—extend over the entire width of the high-bay warehouse and advantageously end outside the high-bay warehouse near the longitudinal sides thereof. The transverse conveyor can consist of, for example, roller-path rollers of which at least some are driven and on which standard containers deposited in pallets, containers directly deposited thereon or coils deposited on shelves run out and can be positioned for further handling. The storage items that have been conveyed in can then be taken over by the storage and retrieval apparatus and stored in the rack bays or, by reverse movement sequences, retrieved. The sequence of storage and retrieval can be substantially shortened in time because the storage and retrieval apparatus no longer has to cover large travel paths, since the transverse conveyors crossing either all lanes or—in the case of a divided construction of the transverse conveyor—at least some, for example two or three, lanes take over provision or distribution—that is selective in the high-bay warehouse—of the taken-over storage items supplied from outside the high-bay warehouse and the conveying in and out thereof. The transverse conveyor according to the invention, which optionally can be provided from a plurality of sections horizontally offset relative to one another and crossing the high-bay warehouse, makes it possible in every case for storage items supplied below the travel plane or travel rail plane of the storage and retrieval apparatus to be handled in variable manner in the high-bay warehouse during both storage and retrieval.

A preferred embodiment of the invention provides that the transverse conveyor is constructed in a pit of the warehouse foundation. The underpasses for the transverse conveyors can be provided in simple manner directly at the time of the foundation work, which facilitates production.

If a return path for return transport of empty pallets, conveying carriages or substructures is advantageously below the transverse conveyor in the pit of the warehouse foundation, in which case the return path combined with the transverse conveyor can similarly have, for example, roller-path rollers or like conveyors, it is possible to achieve closed-circuit use of the means receiving the storage items.

According to another, slightly modified embodiment of the invention the transverse conveyor can be constructed on the warehouse foundation of the lowermost rack bay level of at least one row of successive storage modules. In this case, the transverse conveyor is constructed on the existing foundation of the lowermost rack bays, which makes retrofitting of an existing high-bay warehouse with a transverse conveyor possible in simple manner. The storage items are in that case conveyed in and out from the longitudinal side of the high-bay warehouse. In order to utilize full storage capacity, after occupation of all other rack bays the rack bays of the lowermost rack bay level can still be used.

In addition, in this variant according to an advantageous proposal of the invention a return path for return transport of empty pallets, carrier shelves or conveying carriages in closed circuit is below the transverse conveyor in the warehouse foundation.

The return path can optionally extend parallel to the transverse conveyor, i.e. on the warehouse foundation of the adjacent lowermost rack bay level or on the floor of the pit of the foundation. Whereas in the case of a return path that is deeper by comparison with the transverse conveyor the transport flow takes place in two height levels—in which case the height difference for raising or lowering the storage items or the pallets, conveying carriages or the like can be overcome by, for example, lifting tables—in the case of an arrangement that runs in parallel adjacent manner in one height level, of the transverse conveyor and return path the transfer of empty pallets, conveying carriages or the like to the return path can be taken over by linear displacing means, for example cylinders.

It is proposed to make use of, for preference, storage and retrieval apparatus that comprises a frame that consists of vertical posts and head crossbars and foot beams interconnecting these and that corresponds with the height of the multistory storage modules, with a hoist platform that is moved at the vertical posts by drive means and that is constructed for servicing of the rack bays of the adjacent storage modules on the left-hand side and right-hand side by load receiving means insertable and withdrawable orthogonally to the lane, as known per se, wherein accordance with the invention the foot beam is of frame-like construction with a passage opening for the storage items to be lifted through. The passage opening that is matched to the largest occurring dimension of the storage items, enables free passage of the storage items during lifting from or lowering onto the transverse conveyor arranged in the foundation pit. The same applies in the case of use of the lowermost rack bay level for the transverse conveyor. According to the invention, in that case the storage and retrieval apparatus is movable on two rails arranged in the lanes at a horizontal spacing from and parallel to one another above the lowermost rack bay level, i.e. in the transition from the lowermost rack bay level to the rack bay level following thereabove. Such storage and retrieval apparatus having in the foot beam a passage opening for lifting through the storage items in addition enables handling of storage items in the lanes below the level of the travel rails.

Handling of the storage items below the travel plane of the storage retrieval apparatus is advantageously facilitated if the vertical posts of the frames are extended downwardly beyond the foot beam and protrude somewhat into the lowermost rack bay level. This thus offers a possibility for centered guidance of the lowering or rising hoist platform of the storage and retrieval apparatus by this downwardly prolonged path, for example by rollers supported on the frame extensions.

Further features and details of the invention are evident from the claims and the following description of embodiments of the invention schematically illustrated in the drawings for the transshipment of standard containers, wherein:

FIG. 1 is a partial cross-sectional view of a container transshipment facility and a transfer station upstream of a high-bay warehouse, for taking containers from a vessel (not illustrated) and conveying them to in front of the high-bay warehouse for storage by a storage and retrieval apparatus movable in the lanes thereof on elevated rails therein or for transport away in the case of retrieval with then reverse movement sequences, the high-bay warehouse having in linear alignment with the transfer station a transverse conveyor constructed in the lowermost rack bay level and a return path recessed or disposed deeper in the warehouse foundation;

FIG. 2 is a cross-sectional detail view of a container transshipment facility in a high-bay warehouse where, unlike FIG. 1, the unillustrated transfer stations are upstream of the openings of the lanes and the transverse conveyors and the return paths are in pits of the warehouse foundation and (not illustrated) outside the high-bay warehouse near the longitudinal sides thereof;

FIG. 3 is a partial longitudinal view of a detail of FIG. 2 and of a lane with storage and retrieval apparatus movable therein on the foundation;

FIG. 5 is a detail view of the storage and retrieval apparatus of FIG. 4 substantially showing the foot beam or travel frame with the hoist platform lowered together with a suspended container to above a lowermost rack bay level or a transverse conveyor arranged in a pit of the foundation (cf. FIG. 2); and FIG. 6 is a plan view of FIG. 5.

Figure 1:
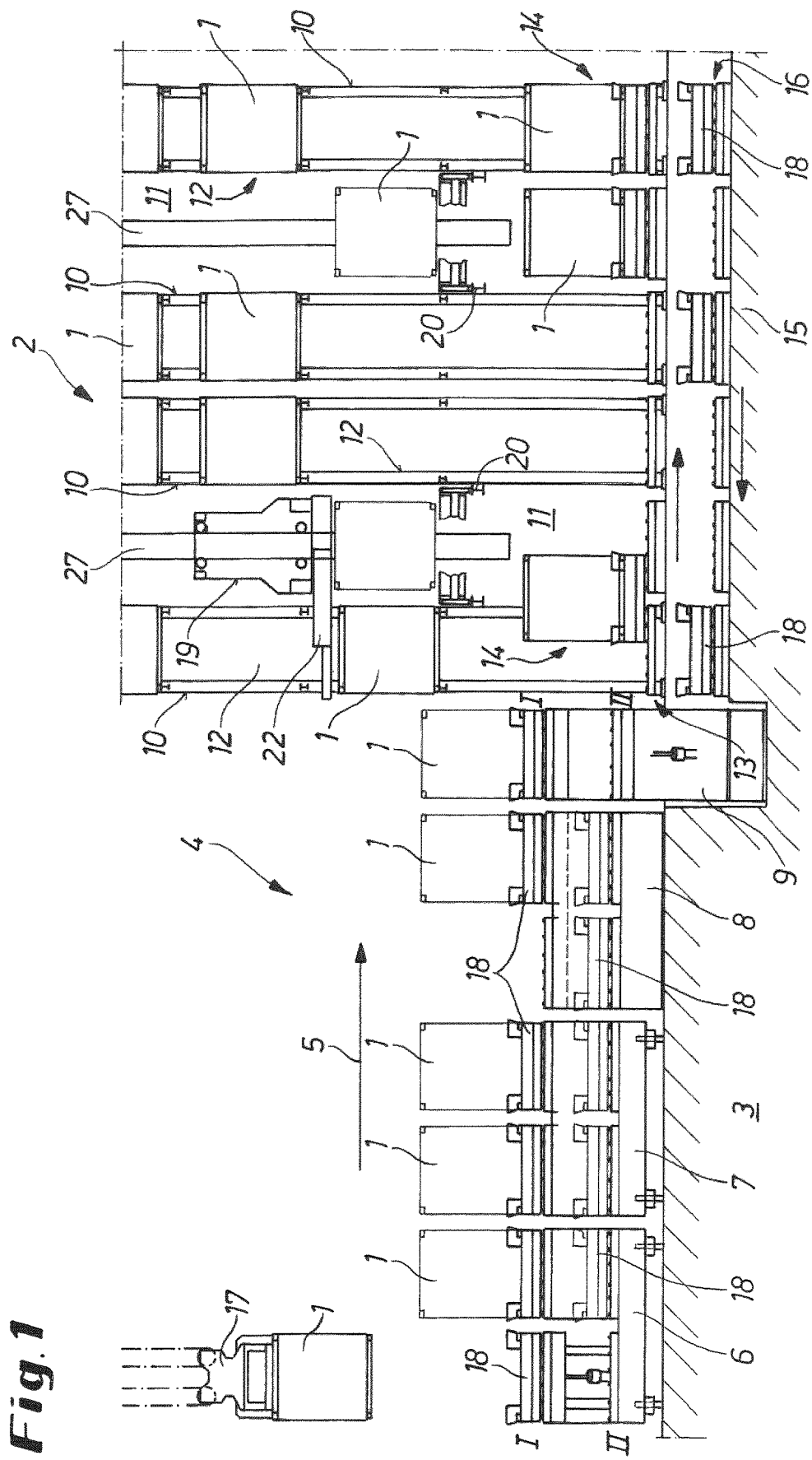

At least one transfer station 4 for unloading containers 1 from a vessel and storage in a high-bay warehouse 2 or, conversely, retrieval and loading of a vessel or a vehicle for onward transportation is, according to FIG. 1, in front of the high-bay warehouse 2 at the side facing the quay 3. This comprises in linear succession in feed direction (arrow) 5 on the quay from outside towards the high-bay warehouse 2 a take-over carriage 6, a distributor vehicle 7 movable out of the line parallel to the high-bay warehouse 2, a stationary deposit 8 and a lifting table 9. The transfer station 4 adjoins, in a line, a transverse conveyor 13 crossing all of the lanes 11 running in the high-bay warehouse 2 between storage modules 10 that follow one another at a mutual spacing over the width, with rack bays 12 therein over the entire height and parallel to the longitudinal sides of the high-bay warehouse. The transverse conveyor 13 is in the lowermost rack bay level 14 on the warehouse foundation 15. A return path 16 is constructed in the warehouse foundation 15 below the transverse conveyor.

The transfer station 4 is in a two-level construction, i.e. the take-over carriage 6, the distributor vehicle 7, the stationary deposit 8 and the lifting table 9 have an upper level 1 and a lower level 11, wherein the lifting table 9 serves the purpose of overcoming height differences between, on the one hand, the upper level 1 of the transfer station 4 as well as the transverse conveyor 13 and, on the other hand, the lower level 11 as well as the return path 16, and of guaranteeing the respective linear path. This is because the container 1 lifted off a vessel by load receiving means 17 of a loading bridge (not illustrated)—optionally two containers 1 can be directly lifted off simultaneously by the load receiving means 17 and delivered to the take-over carriage 6—is deposited, with its longitudinal side facing in feed direction 5, on the upper level 1 of the take-over carriage 6 on a pallet 18 provided thereat, transferred to the uppermost level 1 of the distributor vehicle 7 and transported through movement of the distributor vehicle 7 parallel to the high-bay warehouse 2 until in front of a free stationary deposit 8 of one of the plurality of transfer stations 4 and conveyed from this to the uppermost level 1 of the lifting table 9.

The lifting table 9 lowers the pallet 18 together with the container 1 until in a position aligned with the transverse conveyor 13 that then positions the previously taken-over pallet 18 together with the container 1 in one of the lanes 11 for take-over by storage and retrieval apparatus 19 arranged in each lane 11. The pallets 18 free after taking over of the containers 1 by the storage and retrieval apparatus 19 are lowered at the end of the transverse conveyor 13 by lifting means onto the return path 16 that is recessed in the warehouse foundation 15 and is deeper and that similarly can have, for example, roller-path rollers or the like, and transported oppositely to the feed direction 5 until initially on the lifting table 9 that is adjusted with its lower level 11 in alignment with the return path 13, of the transfer station 4. The lifting table 9 is thereafter raised until its lower level 11 is in alignment with the lower levels 11 of the stationary deposit 8, the distributor vehicle 7 and the take-over carriage 6, so that the pallets 18 are returned by the conveying means of the aforesaid transfer station units to their starting position for reuse. For that purpose, the take-over carriage 6 is similarly equipped with lifting means that lift the pallets 18 from the lower level 11 to the upper level 1.

The storage and retrieval apparatus 19 looks after storage and retrieval or rearranging of the containers 1 into or from the rack bays 12 of the storage modules 10 and, in the embodiment according to FIG. 1, is movable on two rails 20 arranged at a horizontal spacing from one another in the lanes 11 between the lowermost (first) rack bay level 14 and the (second) rack bay level following above that. For storing, a container 1 positioned in a lane 11 is lifted off its pallet 18, for which purpose a hoist platform 21 (cf. FIG. 4)—that as known from WO 2015/123342 A1 can comprise at least two gradual telescopic load receiving means 22, wherein these for adaptation to different lengths of the containers 1 can be movable towards one another or away from one another—is lowered until the telescopic load receiving means 22 arrives above the suspension points of the container 1 by its locking means for locking. The locked and suspended container 1 can thereafter be brought, by raising the hoist platform 21 and moving the storage and retrieval apparatus 19, in front of any rack bay 12 of the adjacent storage modules 10 and be stored in the desired rack bay 12 by gradual telescoping of the load receiving means 22 (telescopic forks or telescopic table). Retrieval takes place with reversed movement sequences.

The free passage of the containers 1 that are taken over from the lowermost rack bay level 14, during storage in the rack bay levels following thereabove, as illustrated in FIG. 6, is made possible by a frame-like construction of the foot beam 23 of the storage and retrieval apparatus 19 with a passage opening 24.

Figure 4:
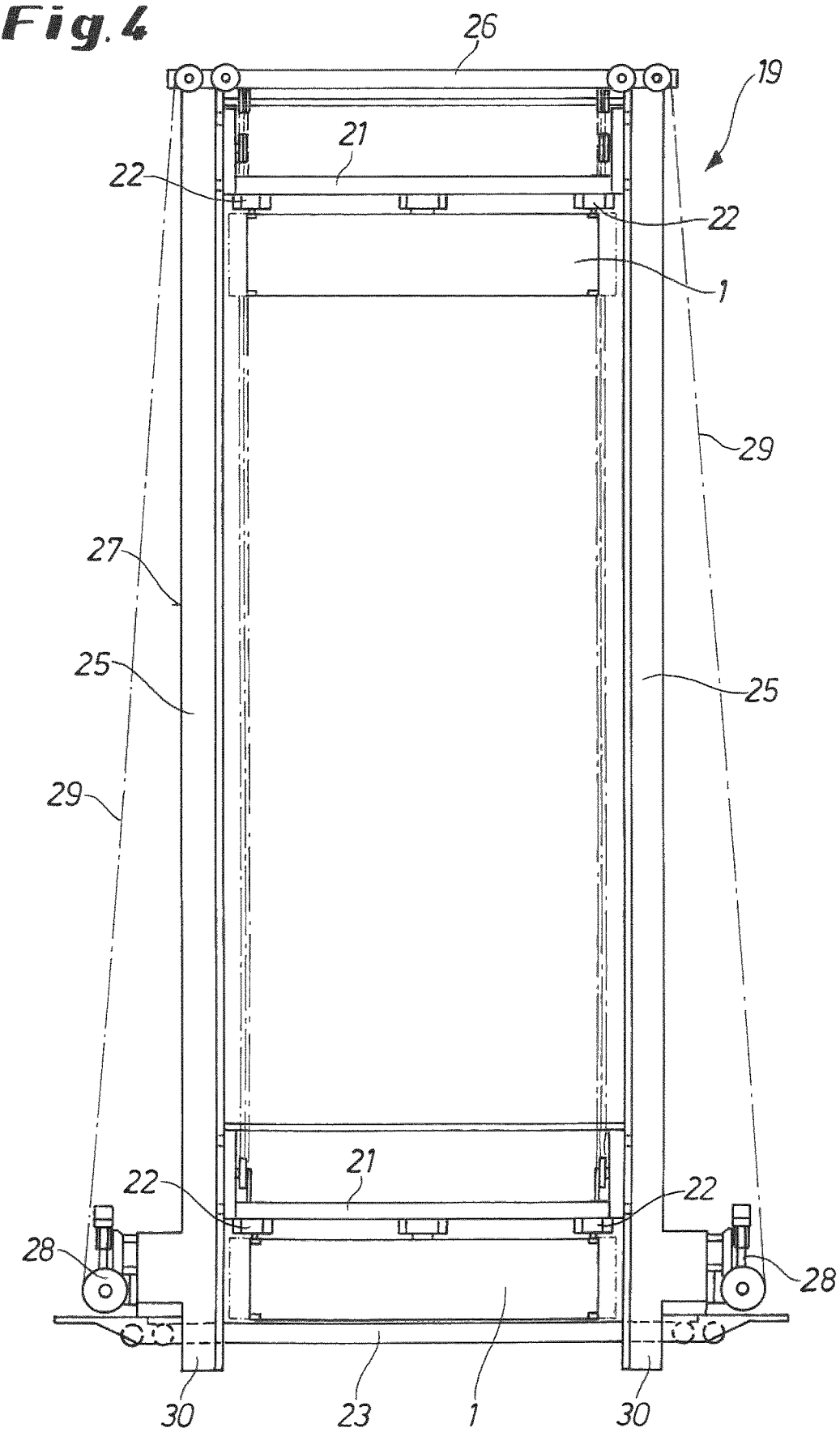
FIG. 4 is an overall view of the storage and retrieval apparatus as seen from the longitudinal side facing the storage modules or rack bays.

The storage and retrieval apparatus 19 enabling space-saving lanes 11 that are very narrow due to the telescopic load receiving means 22 and that correspond with the width dimension of the containers, has—as apparent particularly from FIG. 4 showing the hoist platform 21 with a suspended container 1 in the uppermost position and in a downwardly lowered position (cf. FIG. 5)—a frame 27 that consists of vertical posts 25 and a head crossbar 26 interconnecting these as well as the connecting foot beam 23 constructed with the passage opening 24 for the containers 1 or storage items and that corresponds with the height of the multistory storage modules 10. The raising and lowering of the hoist platform 21 is carried out by hoists 28 at the foot beam 23 and cables 29 deflected at the head crossbar 26 by rollers. In the case of use in, in particular, a construction of the transverse conveyor 13 according to FIG. 1, the vertical posts 25 are provided with an extension 30 projecting over a short travel path downwardly beyond the foot beam 23 (cf. FIG. 4).

In the transshipment facility of FIGS. 2 and 3, the transverse conveyors 113 and the return paths 116 combined therewith and deeper are provided so as to be completely recessed in pits 31 that cross under the high-bay warehouse 2, of the warehouse foundation. The storage and retrieval apparatus 19 can thus be at ground level, i.e. be moved directly on the warehouse foundation 15 (cf. FIG. 3). The above-described transfer stations 4 are here at the quay side in a position aligned with the lanes 11. The containers 1 fed by the load receiving means 17 of the loading bridges from the vessel are again deposited on take-over carriages 6 in pallets 18, transferred to the distributor vehicle 7 and transferred from this to the stationary deposits 8. If the containers 1 are fed by the load receiving means 17 of the loading bridges so as to face not by the narrow ends thereof, but by the wide sides thereof in the direction of the lanes, a rotary table orienting the containers 1 can be upstream of the stationary deposits 8 in the transfer station. The containers 1 positioned in this way in front of the lanes are taken over from there by the storage and retrieval apparatus 19 for storage in the rack bays 12 of the storage modules 10 and the empty pallets 19 are lowered by the lifting table 9 for return to the lower level 11.

The retrieval of the containers 1 after lowering thereof through the passage opening 24 of the foot beam 23 of the storage and retrieval apparatus 19 into the pit 31 is carried out by the transverse conveyor 113 and the return transport of the empty pallets 18 by the return path 116, wherein the transverse conveyors 113 and the return paths 116 end outside the high-bay warehouse 1 near the longitudinal-side outer walls thereof and lifting tables for the containers 1 and on the other hand the empty pallets 18 are there. The lifted containers 1 can be taken over by cranes for loading of, for example, a truck or a vessel. The lowered empty pallets 18 are transported by the return path 116 or the conveying means thereof for lifting to the higher level of the transverse conveyor 113 and positioned by these for reloading with a container 1 that is to be retrieved, below a lane.

Reference numeral list

| | |
|---|---|
| 1 | container/storage items |
| 2 | high-bay warehouse |
| 3 | quay |

-continued

| Reference numeral list | |
|---|---|
| 4 | transfer station |
| 5 | feed direction (arrow) |
| 6 | take-over carriage |
| 7 | distributor vehicle |
| 8 | stationary deposit |
| 9 | lifting table |
| 10 | storage module |
| 11 | lane |
| 12 | rack bay |
| 13; 113 | transverse conveyor |
| 14 | lowermost rack bay level |
| 15 | warehouse foundation |
| 16; 116 | return path |
| 17 | load receiving means (of the loading bridge) |
| 18 | pallet |
| 19 | storage and retrieval apparatus |
| 20 | rails of the storage and retrieval apparatus |
| 21 | hoist platform |
| 22 | load receiving means |
| 23 | foot beam/travel frame |
| 24 | passage opening |
| 25 | vertical posts |
| 26 | head crossbar |
| 27 | frame |
| 28 | hoist |
| 29 | cable |
| 30 | extension (of the vertical posts) |
| 31 | pit |
| I | upper level |
| II | lower level |

The invention claimed is:

1. In combination with a high-bay warehouse:
a plurality of longitudinally and vertically extending racks of a predetermined height and each forming a multiplicity of storage modules in longitudinally extending, vertically stacked, and transversely spaced rows, the racks being separated from one another by lanes extending longitudinally parallel to storing and retrieving sides of the storage modules, and
a respective storage and retrieval apparatus movable longitudinally back and forth in each of the lanes for transporting as well as storing and retrieving or relocating the storage items in the storage modules, the apparatuses each having
vertical posts each having a height greater than the predetermined height of the racks,
horizontal head crossbars and foot beams connecting the posts together, and
a hoist platform movable along the vertical posts for servicing the storage modules on the storing and retrieving sides by load supports transversely insertable into and withdrawable orthogonally to the lanes from the storage modules, the foot beams being of frame-like construction with a passage opening for through passage of the storage item by the hoist platform; and
a transverse conveyor that transversely crosses at least some of the lanes and that conveys the storage items from the storage modules inside the high-bay warehouse to outside the high-bay warehouse and from outside the high-bay warehouse to the apparatuses.

2. The combination according to claim 1, wherein the transverse conveyor is in a pit of the warehouse foundation.

3. The combination according to claim 2, further comprising:
a return path for return transport of empty pallets or conveying carriages is in the pit below the transverse conveyor.

4. The combination according to claim 2, wherein the transverse conveyor is on a floor of the pit and extends parallel to a return path for empty pallets or conveying carriages.

5. The combination according to claim 1, wherein the transverse conveyor is on a warehouse foundation of a lowermost rack level of at least one row of successive storage modules.

6. The combination according to claim 5, further comprising:
a return path below the transverse conveyor in the warehouse foundation and extending from inside the high-bay warehouse to outside the high-bay warehouse for return transport of full or empty pallets or conveying carriages.

7. The combination according to claim 1, wherein the storage and retrieval apparatus is movable on two rails in the lanes at a horizontal spacing from and parallel to one another above the lowermost rack bay level.

8. The combination according to claim 7, wherein the vertical posts of the storage and retrieval apparatus extend downward beyond the foot beam.

* * * * *